United States Patent [19]
Adamczyk, Jr. et al.

[11] Patent Number: 5,410,872
[45] Date of Patent: May 2, 1995

[54] AUTOMOTIVE ENGINE HAVING CATALYTIC EXHAUST AFTERTREATMENT DEVICE AND SECONDARY AIR INJECTION CONTROL SYSTEM FOR MINIMUM CATALYST LIGHT-OFF TIME

[75] Inventors: Andrew A. Adamczyk, Jr.; Clifford N. Montreuil; Scott C. Williams, all of Dearborn, Mich.

[73] Assignee: Ford Motor Company, Dearborn, Mich.

[21] Appl. No.: 131,222

[22] Filed: Oct. 4, 1993

[51] Int. Cl.[6] .................................. F01N 3/20
[52] U.S. Cl. ........................ 60/274; 60/276; 60/289
[58] Field of Search ............. 60/274, 307, 276, 277, 60/289

[56] References Cited
U.S. PATENT DOCUMENTS

| | | |
|---|---|---|
| 3,662,540 | 5/1972 | Murphy . |
| 3,826,089 | 7/1974 | Nakajima et al. . |
| 3,827,237 | 8/1974 | Linder et al. . |
| 3,842,600 | 10/1974 | Nakajima et al. . |
| 3,869,858 | 3/1975 | Goto et al. . |
| 3,919,842 | 11/1975 | Bolton . |
| 3,945,204 | 3/1976 | Knapp . |
| 3,961,477 | 6/1976 | Grieshaber et al. . |
| 4,321,792 | 3/1982 | Achard . |
| 4,345,432 | 8/1982 | Iida et al. . |
| 4,793,135 | 12/1988 | Obstfelder et al. . |
| 5,272,872 | 12/1993 | Grutter et al. ............... 60/274 |
| 5,285,639 | 2/1994 | Araki ............................ 60/274 |

*Primary Examiner*—Ira S. Lazarus
*Assistant Examiner*—Daniel J. O'Connor
*Attorney, Agent, or Firm*—Jerome R. Drouillard; Roger L. May

[57] ABSTRACT

An automotive engine and exhaust aftertreatment system includes an engine, a catalytic exhaust aftertreatment device for receiving exhaust gas from the engine, and an air source for supplying air to the exhaust stream entering the catalyst. An exhaust gas oxygen sensor determines the amount of oxygen contained in the exhaust entering the catalyst, and an engine control computer connected with the air source and with the oxygen sensor monitors the amount of oxygen contained in the exhaust and controls the amount of air supplied to the exhaust stream by the air source such that the available oxygen is slightly in excess of the stoichiometric requirement. In this manner, the light-off time of the catalyst is minimized.

13 Claims, 1 Drawing Sheet

AUTOMOTIVE ENGINE HAVING CATALYTIC EXHAUST AFTERTREATMENT DEVICE AND SECONDARY AIR INJECTION CONTROL SYSTEM FOR MINIMUM CATALYST LIGHT-OFF TIME

BACKGROUND OF THE INVENTION

The present invention relates to an automotive engine having an exhaust gas aftertreatment system including a catalytic converter, a source of secondary air injection, and means for controlling the secondary air to achieve minimum catalyst light-off times.

DESCRIPTION OF THE PRIOR ART

The regulated exhaust emission constituents from automotive vehicles include unburned hydrocarbon ("HC") and carbon monoxide ("CO"). Emissions of HC and CO are controlled by the use of catalytic aftertreatment devices. The catalysis reactions cannot occur at low temperatures, and the catalytic converter must be warmed by the incoming exhaust gases, as well by the exothermicity of the initial catalysis reactions themselves, in order to reach a temperature at which substantial conversion of the gases to carbon dioxide and water occurs. The federal test procedure used to determine compliance with the current tailpipe emission laws requires that the vehicle be started from a so-called cold soak temperature in which the entire vehicle, including the engine and emission control system, are initially at room temperature. It is well known that a large proportion of the HC and CO emissions are produced during the first part of the federal test procedure due to the cold engine condition. Accordingly, it is necessary that the catalytic aftertreatment device be "lit off" or reach operating temperature as soon as possible so as to minimize emissions of HC and CO. Light-off is often assisted by the use of secondary air which involves the injection of atmospheric air into the exhaust stream flowing from the engine to the catalyst. Conventionally, a large excess of air is provided to assure that sufficient oxygen exists in the flowing exhaust stream to oxidize the HC and CO. This injection is not feedback controlled and is incapable of supplying a desired concentration of oxygen to the catalyst in a dynamic manner. It has been determined, however, that optimal light-off times may be obtained if the oxygen content of the gas stream flowing to the catalyst can be controlled so as to be only slightly in excess of the stoichiometric requirement, by an amount determined by experimentation. A system according to the present invention uses an exhaust gas oxygen sensor to measure the level of excess oxygen in the exhaust stream and to adjust the delivered atmospheric air to achieve precise control of the oxygen so as to minimize the light-off time of the catalyst. It is an advantage of a system according to the present invention that the light-off time of the catalyst will be lowered if the teaching of the present invention is followed, with the result that minimum tailpipe emissions of hydrocarbons and CO will ensue.

SUMMARY OF THE INVENTION

An automotive engine exhaust aftertreatment system includes an engine, a catalytic exhaust aftertreatment device for receiving exhaust gas from the engine, and an air source for supplying air to the exhaust stream entering the catalyst. An exhaust gas oxygen sensor determines the amount of oxygen contained in the exhaust entering the catalyst and an engine control computer connected with the air source and with the oxygen sensor monitors the amount of oxygen contained in the exhaust and controls the amount of air supplied to the exhaust stream by the air source such that the available oxygen is slightly in excess of the stoichiometric requirement. The computer will maintain the level of excess oxygen at 0.5–1.5 volume percent of the total stoichiometric gas flow. This will assure that approximately 1% free oxygen will remain in the exhaust stream exiting the catalyst. The catalyst may comprise either a three-way catalyst or a conventional oxidizing catalyst. In a preferred embodiment, the air source comprises a variable speed pump, with the speed of the pump controlled by the engine control computer. Alternatively, the pump may be powered by the engine, with a computer controlled valve arrangement used to achieve variable air delivery. According to yet another aspect of the present invention, a method for treating the engine exhaust in an automotive vehicle equipped with an internal combustion engine having an exhaust system with an exhaust treatment catalyst includes the steps of controlling the amount of fuel furnished to the engine such that the engine operates at approximately a stoichiometric air/fuel ratio, operating an air supply device so as to inject air into the engine exhaust system upstream of the catalyst, and measuring the amount of oxygen in the exhaust stream flowing into the catalyst. Thereafter, the amount of air injected in the exhaust system will be adjusted such that the volume of oxygen in the gas stream entering the catalyst exceeds the total volume of the stoichiometrically correct mixture by approximately 0.5–1.5%.

DETAILED DESCRIPTION OF THE PREFERRED EMBODIMENTS

Figure 1:
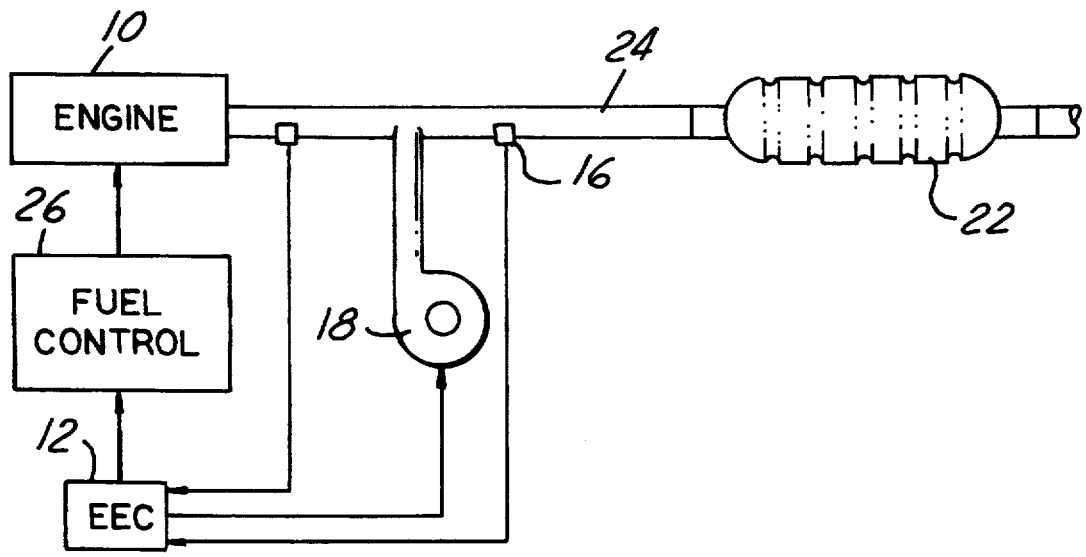
FIG. 1 is a schematic representation of an engine having an exhaust emission control system according to the present invention.

As shown in the FIG. 1, automotive engine 10 has an exhaust emission control system including catalytic exhaust aftertreatment device 22 for receiving exhaust gas from the engine. Catalyst 22 may comprise either a conventional oxidizing catalyst ("COC"), a three-way catalyst ("TWC"), or a combination thereof. In either event, it is desirable to introduce a precisely controlled amount of oxygen to the catalyst during cold engine operation so as to produce the minimum light-off time for the catalyst. Oxygen is introduced via air pump 18, which injects atmospheric air into exhaust pipe 24 ahead of the catalyst. The oxygen content of the mixture entering the catalyst is monitored by engine control computer 12 ("EEC") in conjunction with downstream oxygen sensor 16, which is mounted in exhaust pipe 24 before catalyst 22, but after the point at which pump 18 injects air into exhaust pipe 24. It is believed that a system according to the present invention will operate best with a universal exhaust gas oxygen sensor ("UEGO"). In particular, the UEGO will give a finer level of control than other types of exhaust gas oxygen sensors because its performance is generally linear at the lower oxygen levels prescribed by the present invention. Also, UEGO sensors generally are small and have little thermal inertia, which promotes faster response.

Engine control computer 12 will operate air pump 18 so as to maintain the volume of excess oxygen in the gas stream entering catalyst 22 at approximately 0.5–1.5% over the volume of the precise stoichiometric mixture. Maintaining the oxygen level only slightly in excess of the stoichiometric requirement will assure that adequate oxygen availability is maintained to promote catalysis within catalyst 22 without having excess oxygen and, more importantly, atmospheric nitrogen, both of which would act as a diluent so as to undesirably cool the gases entering the catalyst. According to yet another aspect of the present invention, engine control computer 12 may operate air pump 18 by changing the speed of the air pump according to the amount of air required to be delivered to exhaust pipe 24. Alternatively, pump 18 may comprise a variable speed pump powered by engine 10, or a constant speed pump having a duty cycle modulated solenoid valve, for example, interposed between the pump and exhaust pipe 24 so as to control the amount of air flowing into the exhaust pipe. Those skilled in the art will appreciate in view of this disclosure that other arrangements could be used to supply air to exhaust pipe 24, including a venturi or other types of air pumps and valving arrangements known to those skilled in the art and suggested by this disclosure.

With certain engine applications, it may be desirable to run the engine's fuel system in closed loop fashion such that engine control computer 12 operating fuel control 26 supplies fuel to the engine with the assistance of an upstream exhaust oxygen sensor, 14, which is positioned immediately downstream of the engine and before the point at which air is injected via line 20 from pump 18. In this manner, the engine may be operated to achieve minimum engine out emissions by controlling the engine so as to maintain approximately a stoichiometric air/fuel mixture in the engine, while using downstream sensor oxygen sensor 16 to sense the oxygen in the mixture after the addition of the air from air pump 18. With or without the use of upstream oxygen sensor 14, engine control computer 12 will operate air pump 18 so as to adjust the amount of air injected into exhaust pipe 24 such that the volume of oxygen in the gas stream entering catalyst 22 exceeds the volume of the stoichiometric mixture by approximately 0.5–1.5%.

Figure 2:
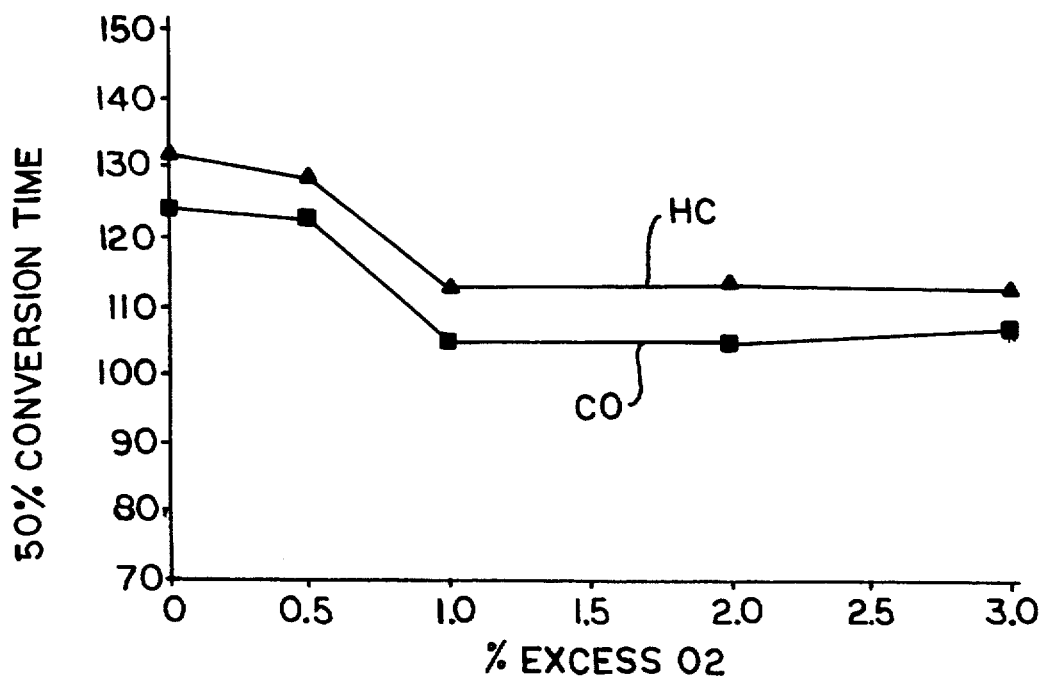
FIG. 2 is a graphical representation of the effect upon catalyst light-off time of a method and system according to the present invention.

FIG. 2 is a graphical representation of the effect of controlling the percent of excess oxygen according to the present invention upon the light-off time. In the laboratory test which generated the data, the percent of excess oxygen is shown on the abscissa as ranging from 0–3%. To achieve these concentrations of oxygen, a mixture of gases simulating an exhaust stream was flowed past a production TWC which had been aged on a vehicle for 50,000 miles. The catalyst had a platinum/rhodium ratio of 5/1 and a precious metal loading of 20 g/ft$^3$. The 50% conversion times for both hydrocarbons and carbon monoxide are shown on the ordinant. As shown in the FIG. 2, at 0% excess oxygen, which corresponds to a precise stoichiometric mixture, approximately 125–130 seconds were required for the catalyst to warm sufficiently to achieve 50% conversion of the hydrocarbons and carbon monoxide. Although 0.5% excess oxygen produced some improvement in the light-off time, a dramatic improvement was achieved at 1.0% excess oxygen; notice that the average time to reach 50% conversion is approximately 110 seconds, down from approximately 130 seconds, for the earlier case of 0% excess oxygen. Notice also that as the percentage of excess oxygen was increased above 1% to 2% and 3%, the time to reach 50% conversion did not change markedly. Without wishing to be bound by the following theory, it is believed that cooling occurs which counteracts the otherwise beneficial effect of the excess oxygen as the amount of air introduced into the system increases. Accordingly, it is believed that it is desirable to operate the system at 0.5–1.5% excess oxygen over the stoichiometric volume. Those skilled in the art will appreciate in view of this disclosure that the actual time required to achieve a 50% conversion rate for any catalyst will vary for the particular type of catalyst. Moreover, the optimum percentage of oxygen must generally be determined through testing. In any event, it is believed that the oxygen should be kept to a small percentage of excess as claimed herein to achieve optimum results. According to another aspect of the present invention, the type of test described above may me employed as a method for determining an appropriate amount of excess oxygen for injection into the exhaust stream of an engine so as to minimize the light-off time of an exhaust aftertreatment catalyst. In essence, after measuring the percent conversion of hydrocarbons within the catalyst as a function of time for a number of excess oxygen levels, an airflow level may be selected to provide an amount of oxygen in the gas stream entering the catalyst which approximates the amount which causes the catalyst to light-off in the minimum amount of time.

Those skilled in the art will understand that variations and modifications may be made to the present invention without departing from the spirit and scope of the invention as defined in the appended Claims.

We claim:

1. An automotive engine and exhaust aftertreatment system comprising:
   an engine;
   a catalytic exhaust aftertreatment device for receiving exhaust gas from the engine;
   an air source for supplying air to the exhaust stream entering the catalyst;
   an exhaust gas oxygen sensor for determining the amount of oxygen contained in the exhaust entering the catalyst; and
   an engine control computer, connected with said air source and with said oxygen sensor, for monitoring the amount of oxygen contained in the exhaust and for controlling the amount of air supplied to the exhaust stream by the air source such that the available oxygen is slightly in excess of the stoichiometric requirement until the catalyst has reached light-off.

2. An automotive engine and exhaust aftertreatment system according to claim 1, wherein said computer maintains the level of excess oxygen at 0.5–1.5 volume percent of the stoichiometric mixture.

3. An automotive engine and exhaust aftertreatment system according to claim 1, wherein said catalyst comprises a three way catalyst.

4. An automotive engine and exhaust aftertreatment system according to claim 1, wherein said air source comprises a variable speed pump, with the speed of the pump being controlled by said engine control computer.

5. An automotive engine and exhaust aftertreatment system according to claim 1, wherein said air source comprises a variable speed pump powered by said engine.

6. An automotive engine and exhaust aftertreatment system comprising:
an engine;
an upstream exhaust gas oxygen sensor for determining the amount of oxygen contained in the exhaust flowing from the engine;
a catalytic exhaust aftertreatment device for receiving exhaust gas from the engine;
an air source for supplying air to the exhaust stream entering the catalyst;
a downstream exhaust gas oxygen sensor for determining the amount of oxygen contained in the exhaust entering the catalyst;
a fuel control for furnishing fuel to the engine; and
an engine control computer connected with said air source and with said oxygen sensors, as well as with said fuel control, for monitoring the amount of oxygen contained in the exhaust leaving the engine and for operating said fuel control to maintain approximately a stoichiometric air/fuel mixture in the engine, with said computer controlling the amount of air supplied to the exhaust stream by the air source such that the available oxygen in the exhaust stream entering the catalyst is slightly in excess of the stoichiometric requirement until the catalyst reaches operating temperature.

7. An automotive engine and exhaust aftertreatment system according to claim 6, wherein said computer maintains the level of excess oxygen at 0.5–1.5 volume percent of the stoichiometric volume.

8. An automotive engine and exhaust aftertreatment system according to claim 6, wherein said computer maintains the level of excess oxygen such that the exhaust gas exiting said catalyst contains approximately 1% free oxygen.

9. An automotive engine and exhaust aftertreatment system according to claim 6, wherein said catalyst comprises a three way catalyst.

10. An automotive engine and exhaust aftertreatment system according to claim 6, wherein said air source comprises a variable speed pump, with the speed of the pump being controlled by said engine control computer.

11. A method for treating the engine exhaust of an automotive vehicle equipped with an internal combustion engine having an exhaust system with an exhaust treatment catalyst, comprising the steps of:
operating an air supply device so as to inject air into the engine exhaust system upstream of the catalyst;
measuring the amount of oxygen in the exhaust stream flowing into the catalyst; and
adjusting the amount of air injected into the exhaust system such that the amount of oxygen in the gas stream entering the catalyst exceeds the stoichiometric amount by approximately 0.5 to 1.5 percent.

12. A method for treating the engine exhaust of an automotive vehicle according to claim 11, further comprising the step of controlling the amount of fuel furnished to the engine such that the engine operates at approximately a stoichiometric air/fuel ratio.

13. A method for determining an appropriate amount of excess oxygen for injection into the exhaust stream of an engine so as to minimize the light-off time of an exhaust aftertreatment catalyst receiving said exhaust stream, comprising the steps of:
operating an air supply device so as to inject increasingly greater amounts of air into the engine exhaust system upstream of the catalyst;
measuring the amount of oxygen in the exhaust stream flowing into the catalyst;
determining the percent conversion of hydrocarbons in the catalyst as a function of time; and
adjusting the amount of air injected into the exhaust system such that the amount of oxygen in the gas stream entering the catalyst approximates the amount which causes the catalyst to light-off in the minimum amount of time.

* * * * *